US012748884B2

(12) United States Patent
Nouri et al.

(10) Patent No.: US 12,748,884 B2
(45) Date of Patent: Sep. 29, 2026

(54) METHOD AND SYSTEM FOR ENSURING PRIVACY PROTECTION FOR DATASETS USING SPACE PARTITIONING TECHNIQUES

(71) Applicant: JPMorgan Chase Bank, N.A., New York, NY (US)

(72) Inventors: Navid Nouri, Amsterdam (NL); Eleonora Kreacic, London (GB); Vamsi Krishna Potluru, New York, NY (US); Tucker Richard Balch, Suwanee, GA (US); Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 137 days.

(21) Appl. No.: 18/212,438

(22) Filed: Jun. 21, 2023

(65) Prior Publication Data

US 2024/0249019 A1 Jul. 25, 2024

Related U.S. Application Data

(60) Provisional application No. 63/440,567, filed on Jan. 23, 2023.

(51) Int. Cl.
*G06F 21/62* (2013.01)

(52) U.S. Cl.
CPC ................................ *G06F 21/6245* (2013.01)

(58) Field of Classification Search
None
See application file for complete search history.

(56) References Cited

U.S. PATENT DOCUMENTS

| | | | | |
|---|---|---|---|---|
| 12,182,179 | B1 * | 12/2024 | Aravamudan | G06F 40/20 |
| 2020/0012902 | A1 * | 1/2020 | Walters | G06F 18/23 |
| 2021/0336938 | A1 * | 10/2021 | Karabatis | H04L 63/1475 |
| 2022/0277097 | A1 * | 9/2022 | Cabot | H04W 12/02 |
| 2022/0277812 | A1 * | 9/2022 | Kim | G16B 20/20 |

OTHER PUBLICATIONS

Zhu, Tianqing et al. âDifferentially Private Data Publishing and Analysis: A Survey.â IEEE Transactions on Knowledge and Data Engineering 29 (2017): 1619-1638. (Year: 2017).*

* cited by examiner

*Primary Examiner* — Benjamin E Lanier
*Assistant Examiner* — Felicia Farrow
(74) *Attorney, Agent, or Firm* — GREENBLUM & BERNSTEIN, P.L.C.

(57) ABSTRACT

Systems and methods for generation of a synthetic dataset that simultaneously represents the original data and preserves privacy are provided. The objective of answering statistical queries in a differentially-private manner is addressed by providing data-independent and data-dependent algorithms based on space partitioning for differentially private dataset release. These algorithms are intuitive and transparent, resulting in theoretical results on the utility-privacy tradeoffs where utility is measured with respect to kernel density preservation. The data-dependent approach overcomes the curse of dimensionality and leads to a scalable algorithm.

9 Claims, 7 Drawing Sheets

500

Algorithm 1 Data independent binning procedure DATAINDEPENDENT($P, \epsilon, t, w$)
▷ $P$ is the original dataset, $\epsilon$ is privacy budget
▷ $t$ is filtering threshold, $w$ is bin width
$R \leftarrow$ the edge length of the axes aligned hypercube that encompasses $P$
Apply binning using bins of width $w$
$J \leftarrow (R/w)^d$ ▷ Number of bins
$\mathbf{v} \in \mathbb{R}^J \leftarrow$ vector of point counts bin by bin
$c_1, c_2, \ldots, c_J \leftarrow$ centers of bins
$\tilde{\mathbf{v}} \leftarrow \mathbf{v} + Lap(\frac{2}{\epsilon} I_{J \times J})$ ▷ Noisy point counts
For any $i \in [J]$, if $\tilde{\mathbf{v}}_i < t$, then $\tilde{\mathbf{v}}_i \leftarrow 0$
▷ Filtering step: Removing bins below $t$
Output $Q := \{(c_i, \tilde{\mathbf{v}}_i) \text{ for } i \in [J] \text{ if } \tilde{\mathbf{v}}_i > 0\}$

FIG. 5

600

Algorithm 2 Adaptive binning procedure ADAPTIVE-BINNING($P, \epsilon', \tau$)
▷ dataset $P$, DP budget $\epsilon'$,cut off level $\tau$
For any $i \in [d]$, $\text{low}_i \leftarrow \min_{p \in P}(p_i)$
For any $i \in [d]$, $\text{high}_i \leftarrow \max_{p \in P}(p_i)$
For any $i \in [d]$, $c_i \leftarrow \frac{\text{low}_i + \text{high}_i}{2}$
$w \leftarrow \max_i(\text{high}_i - \text{low}_i)$
curr-axis $\leftarrow 0$ ▷ axis the bin will be cut along
node $\leftarrow$ NODE($P, c, w$, curr-axis)
RECURSIVE-BINNING(node, $\epsilon', \tau$)

FIG. 6

700

Algorithm 3 Recursive binning procedure RECURSIVE-BINNING(NODE, $\epsilon'$, $\tau$, $s_1$, $s_2$)
$\triangleright$ Node to recurse on, DP budget $\epsilon'$, threshold $\tau$
$\triangleright$ max and min edge length for final bins $s_1$ and $s_2$
$P, c, w$, curr-axis $\leftarrow$ node
if $|P| \leq \tau + \text{LAP}(2(h'-h)/\epsilon')$ and the bin's largest edge length $\leq s_1$ then return
$\triangleright h' - h = d \log_2(s_1/s_2)$ is the max depth of data dependent part of the tree
if the bin's largest edge length $< s_2$ then return
$P_\ell, P_r \leftarrow \emptyset, \emptyset$
for $p \in P$ do
if $p_{curr-axis} \leq c_{curr\text{-}axis}$ then $P_\ell \leftarrow P_\ell \cup \{p\}$
else $P_r \leftarrow P_r \cup \{p\}$
$c_\ell, c_r \leftarrow c, c$
$c_{\ell,curr-axis} \leftarrow c_{curr-axis} - w/4$
$c_{r,curr-axis} \leftarrow c_{curr-axis} + w/4$ $\triangleright$ coordinates of newly formed bins centers
if curr-axis $= d - 1$ then $w \leftarrow w/2$
node.left $\leftarrow$ NODE($P_\ell, c_\ell, w$, (curr-axis + 1)%$d$)
RECURSIVE-BINNING(node.left, $\epsilon'$, $\tau$)
node.right $\leftarrow$ NODE($P_r, c_r, w$, (curr-axis + 1)%$d$)
RECURSIVE-BINNING(node.right, $\epsilon'$, $\tau$)

FIG. 7

800

Algorithm 4 Explicit implementation for any empty bin do
  $\eta \leftarrow \text{LAP}(2/\epsilon)$
  if $\text{POINTCOUNT}(\text{bin}) + \eta = 0 + \eta \geq t$ then
    add this bin center with weight $\eta$ to the output

FIG. 8

900

Algorithm 5 Implicit implementation $K \leftarrow$ the number of empty bins
$p \leftarrow \Pr[\text{LAP}(2/\epsilon) \geq t]$
$m \leftarrow \text{BINOM}(K, p)$
sample $m$ empty bins out of $K$ empty bins without replacement
for each sampled empty bin do
  $\eta \leftarrow$ a sample of $\text{CONDITIONALLAP}(2/\epsilon, t)$
  add this bin center with weight $\eta$ to the output

FIG. 9

METHOD AND SYSTEM FOR ENSURING PRIVACY PROTECTION FOR DATASETS USING SPACE PARTITIONING TECHNIQUES

CROSS-REFERENCE TO RELATED APPLICATIONS

This application claims priority benefit from U.S. Provisional Application No. 63/440,567, filed Jan. 23, 2023, which is hereby incorporated by reference in its entirety.

BACKGROUND

1. Field of the Disclosure

This technology generally relates to methods and systems for generating synthetic data that provides accuracy and preserves privacy, and more particularly to methods and systems for generating synthetic datasets that accurately represent original data and preserve privacy by using space partitioning techniques and noisy perturbation of point counts.

2. Background Information

Preserving privacy of individuals while publishing a dataset for public use is a known challenge. A de facto standard for privacy is differential privacy (DP), which is widely used in the literature and in practice. Many existing results on differential privacy aim to preserve quality of answers for a certain class of queries for a survey. However, a more general problem studies the release of a differentially private synthetic dataset that can be used for downstream tasks without additional privacy leaks. Recent work mainly applies generative adversarial networks (GAN) and utilizes divergence metrics such as Jensen-Shannon divergence and Wasserstein distance as a metric of quality to compare synthetic and original datasets. Another class of utility metrics is based on kernels, e.g., distance in reproducing kernel Hilbert space (RKHS) or similarly maximum mean discrepancy (MMD). The advantage of using these metrics is that they capture a wide class of statistical properties of the dataset, as they compare two probability measures in terms of all possible moments.

One key technique is space partitioning. Similar ideas have been used in the literature for designing differentially private statistical query algorithms and histogram release applications. However, naive implementation of space partitioning techniques for DP dataset release problem suffers from the curse of dimensionality in high dimensions.

Accordingly, there is a need for a method for generating synthetic datasets that accurately represent original data and preserve privacy by using space partitioning techniques and noisy perturbation of point counts.

SUMMARY

The present disclosure, through one or more of its various aspects, embodiments, and/or specific features or sub-components, provides, inter alia, various systems, servers, devices, methods, media, programs, and platforms for generating synthetic datasets that accurately represent original data and preserve privacy by using space partitioning techniques and noisy perturbation of point counts.

According to an aspect of the present disclosure, a method for generating a synthetic dataset is provided. The method is implemented by at least one processor. The method includes: receiving, by the at least one processor, a first set of original data that exists in a first space; partitioning, by the at least one processor, the first space into a plurality of bins, each respective bin from among the plurality of bins having a predetermined first width; determining, by the at least one processor for each respective bin from among the plurality of bins, a respective center of the respective bin; determining, by the at least one processor for each respective bin from among the plurality of bins, a respective number of points from among the first set of original data that is inside the respective bin; generating, by the at least one processor for each determined respective number of points, a respective bin-specific vector that corresponds to the respective bin; generating, by the at least one processor for each respective bin-specific vector, a respective synthetic vector that corresponds to the respective bin by adding a respective noise component to the respective bin-specific vector; and generating, by the at least one processor, a respective synthetic data point to be included in the synthetic data set by combining, for each respective bin, the respective synthetic vector that corresponds to the respective bin with the respective center of the respective bin.

For a first predetermined privacy budget value $\varepsilon 1$, the first set of original data may be $\varepsilon 1$—differentially private with respect to the synthetic data set.

The respective noise component may include a Laplace noise component having a value that varies inversely with respect to the first predetermined privacy budget value $\varepsilon 1$.

The method may further include: identifying at least one respective synthetic vector for which the respective noise component has a value that is less than a predetermined noise threshold; and filtering out the at least one respective synthetic vector before performing the generating of the respective synthetic data point that corresponds to the at least one respective synthetic vector.

The method may further include: before performing the partitioning, applying an adaptive binning algorithm to the first set of original data in order to generate a plurality of children nodes that respectively correspond to subsets of the first set of original data.

The partitioning may include applying a recursive binning algorithm to an output of the adaptive binning algorithm. The plurality of bins may be determined as an output of the recursive binning algorithm.

The recursive binning algorithm may use a first predetermined privacy budget value $\varepsilon 1$ and a second predetermined privacy budget value $\varepsilon 2$ as inputs in order to ensure differential privacy is maintained with respect to the plurality of bins.

When a first subset of the first set of original data that corresponds to the first predetermined privacy budget value $\varepsilon 1$ is combined with a second subset of the first set of original data that corresponds to the second predetermined privacy budget value $\varepsilon 2$, a combination of the first subset and the second subset may be $(\varepsilon 1+\varepsilon 2)$—differentially private with respect to the synthetic data set.

The method may further include stopping an application of the recursive binning algorithm when a number of data-dependent levels of a decision tree that corresponds to an output of the recursive binning algorithm exceeds a predetermined threshold.

According to another exemplary embodiment, a computing apparatus for generating a synthetic data set is provided. The computing apparatus includes a processor; a memory; and a communication interface coupled to each of the processor and the memory. The processor is configured to:

receive, via the communication interface, a first set of original data that exists in a first space; partition the first space into a plurality of bins, each respective bin from among the plurality of bins having a predetermined first width; determine, for each respective bin from among the plurality of bins, a respective center of the respective bin; determine, for each respective bin from among the plurality of bins, a respective number of points from among the first set of original data that is inside the respective bin; generate, for each determined respective number of points, a respective bin-specific vector that corresponds to the respective bin; generate, for each respective bin-specific vector, a respective synthetic vector that corresponds to the respective bin by adding a respective noise component to the respective bin-specific vector; and generate a respective synthetic data point to be included in the synthetic data set by combining, for each respective bin, the respective synthetic vector that corresponds to the respective bin with the respective center of the respective bin.

For a first predetermined privacy budget value ε1, the first set of original data may be ε1—differentially private with respect to the synthetic data set.

The respective noise component may include a Laplace noise component having a value that varies inversely with respect to the first predetermined privacy budget value ε1.

The processor may be further configured to: identify at least one respective synthetic vector for which the respective noise component has a value that is less than a predetermined noise threshold; and filter out the at least one respective synthetic vector before performing the generation of the respective synthetic data point that corresponds to the at least one respective synthetic vector.

The processor may be further configured to: before performing the partitioning, apply an adaptive binning algorithm to the first set of original data in order to generate a plurality of children nodes that respectively correspond to subsets of the first set of original data.

The processor may be further configured to perform the partitioning by applying a recursive binning algorithm to an output of the adaptive binning algorithm. The plurality of bins may be determined as an output of the recursive binning algorithm.

The recursive binning algorithm may use a first predetermined privacy budget value ε1 and a second predetermined privacy budget value ε2 as inputs in order to ensure differential privacy is maintained with respect to the plurality of bins.

When a first subset of the first set of original data that corresponds to the first predetermined privacy budget value ε1 is combined with a second subset of the first set of original data that corresponds to the second predetermined privacy budget value ε2, a combination of the first subset and the second subset may be (ε1+ε2)—differentially private with respect to the synthetic data set.

The processor may be further configured to stop an application of the recursive binning algorithm when a number of data-dependent levels of a decision tree that corresponds to an output of the recursive binning algorithm exceeds a predetermined threshold.

According to yet another exemplary embodiment, a non-transitory computer readable storage medium storing instructions for generating a synthetic data set is provided. The storage medium includes executable code which, when executed by a processor, causes the processor to: receive a first set of original data that exists in a first space; partition the first space into a plurality of bins, each respective bin from among the plurality of bins having a predetermined first width; determine, for each respective bin from among the plurality of bins, a respective center of the respective bin; determine, for each respective bin from among the plurality of bins, a respective number of points from among the first set of original data that is inside the respective bin; generate, for each determined respective number of points, a respective bin-specific vector that corresponds to the respective bin; generate, for each respective bin-specific vector, a respective synthetic vector that corresponds to the respective bin by adding a respective noise component to the respective bin-specific vector; and generate a respective synthetic data point to be included in the synthetic data set by combining, for each respective bin, the respective synthetic vector that corresponds to the respective bin with the respective center of the respective bin.

For a first predetermined privacy budget value ε1, the first set of original data may be ε1—differentially private with respect to the synthetic data set.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 5 is an algorithm to be applied for performing a data-independent binning function in a method for generating synthetic datasets that accurately represent original data and preserve privacy by using space partitioning techniques and noisy perturbation of point counts, according to an exemplary embodiment.

FIG. 6 is an algorithm to be applied for performing a data-dependent adaptive binning function in a method for generating synthetic datasets that accurately represent original data and preserve privacy by using space partitioning techniques and noisy perturbation of point counts, according to an exemplary embodiment.

FIG. 7 is an algorithm to be applied for performing a data-dependent recursive binning function in a method for generating synthetic datasets that accurately represent original data and preserve privacy by using space partitioning techniques and noisy perturbation of point counts, according to an exemplary embodiment.

FIG. 8 is an algorithm to be applied for performing an explicit implementation function in a method for generating synthetic datasets that accurately represent original data and preserve privacy by using space partitioning techniques and noisy perturbation of point counts, according to an exemplary embodiment.

FIG. 9 is an algorithm to be applied for performing an implicit implementation function in a method for generating synthetic datasets that accurately represent original data and preserve privacy by using space partitioning techniques and noisy perturbation of point counts, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
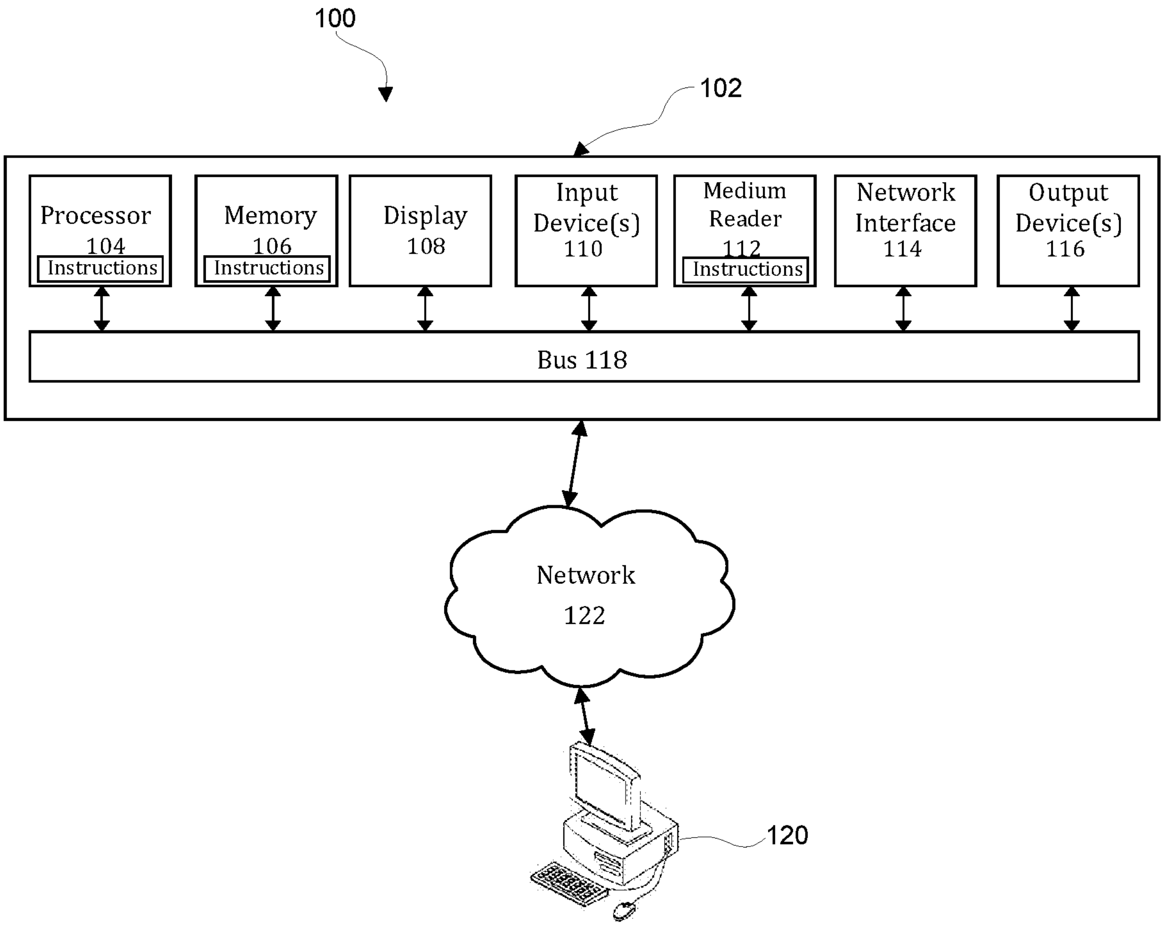
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage:

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for generating synthetic datasets that accurately represent original data and preserve privacy by using space partitioning techniques and noisy perturbation of point counts.

Figure 2:
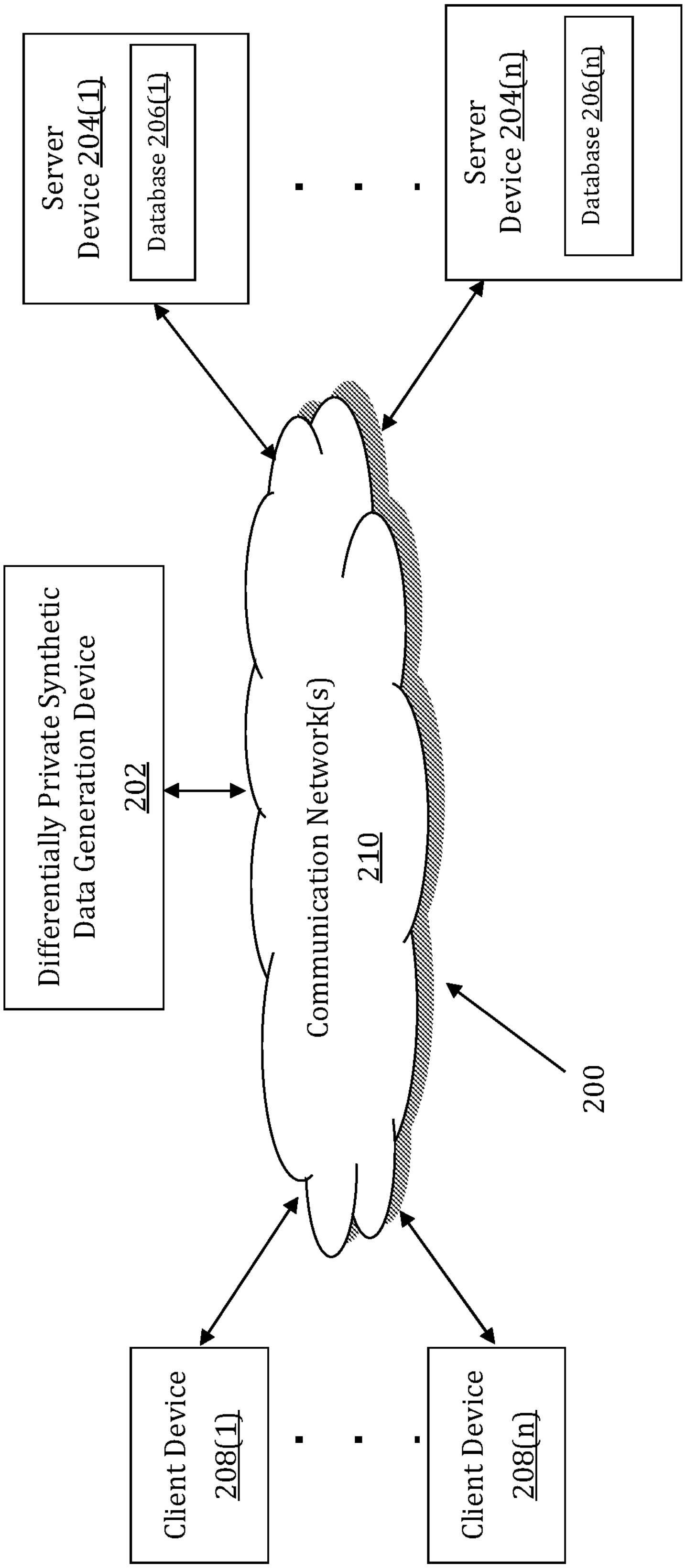
FIG. 2 illustrates an exemplary diagram of a network environment.

Referring to FIG. 2, a schematic of an exemplary network environment 200 for implementing a method for generating synthetic datasets that accurately represent original data and preserve privacy by using space partitioning techniques and noisy perturbation of point counts is illustrated. In an exemplary embodiment, the method is executable on any networked computer platform, such as, for example, a personal computer (PC).

The method for generating synthetic datasets that accurately represent original data and preserve privacy by using space partitioning techniques and noisy perturbation of point counts may be implemented by a Differentially Private Synthetic Data Generation (DPSDG) device 202. The DPSDG device 202 may be the same or similar to the computer system 102 as described with respect to FIG. 1. The DPSDG device 202 may store one or more applications that can include executable instructions that, when executed by the DPSDG device 202, cause the DPSDG device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.)

Even further, the application(s) may be operative in a cloud-based computing environment. The application(s) may be executed within or as virtual machine(s) or virtual server(s) that may be managed in a cloud-based computing environment. Also, the application(s), and even the DPSDG device 202 itself, may be located in virtual server(s) running in a cloud-based computing environment rather than being tied to one or more specific physical network computing devices. Also, the application(s) may be running in one or more virtual machines (VMs) executing on the DPSDG device 202. Additionally, in one or more embodiments of this technology, virtual machine(s) running on the DPSDG device 202 may be managed or supervised by a hypervisor.

In the network environment 200 of FIG. 2, the DPSDG device 202 is coupled to a plurality of server devices 204(1)-204(*n*) that hosts a plurality of databases 206(1)-206(*n*), and also to a plurality of client devices 208(1)-208(*n*) via communication network(s) 210. A communication interface of the DPSDG device 202, such as the network interface 114 of the computer system 102 of FIG. 1, operatively couples and communicates between the DPSDG device 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DPSDG device 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DPSDG devices that efficiently implement a method for generating synthetic datasets that accurately represent original data and preserve privacy by using space partitioning techniques and noisy perturbation of point counts.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DPSDG device 202 may be a standalone device or integrated with one or more other devices or apparatuses, such as one or more of the server devices 204(1)-204(*n*), for example. In one particular example, the DPSDG device 202 may include or be hosted by one of the server devices 204(1)-204(*n*), and other arrangements are also possible. Moreover, one or more of the devices of the DPSDG device 202 may be in a same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the DPSDG device 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206(*n*) that are configured to store information that relates to content and statistics for original datasets and information that relates to utility metrics for synthetic dataset quality.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208(1)-208(*n*) in this example may include any type of computing device that can interact with the DPSDG device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the DPSDG device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the DPSDG device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DPSDG device 202, the server devices 204(1)-204(*n*), or the client devices 208(1)-208(*n*), for example, may be configured to operate as virtual instances on the same physical machine. In other words, one or more of the DPSDG device 202, the server devices 204(1)-204(*n*), or the client devices 208(1)-208(*n*) may operate on the same physical device rather than as separate devices communicating through communication network(s) 210. Additionally, there may be more or fewer DPSDG devices 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
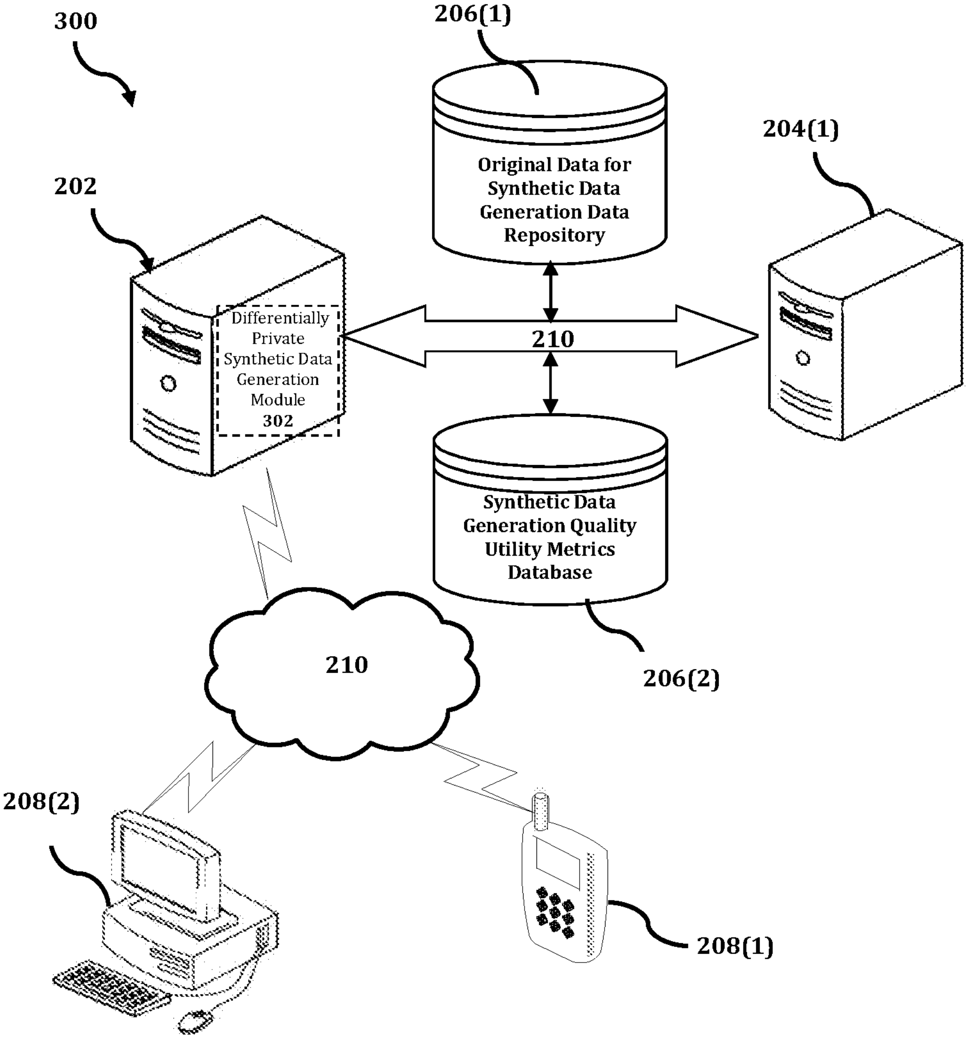
FIG. 3 shows an exemplary system for implementing a method for generating synthetic datasets that accurately represent original data and preserve privacy by using space partitioning techniques and noisy perturbation of point counts.

The DPSDG device 202 is described and illustrated in FIG. 3 as including a differentially private synthetic data generation module 302, although it may include other rules, policies, modules, databases, or applications, for example. As will be described below, the differentially private synthetic data generation module 302 is configured to implement a method for generating synthetic datasets that accurately represent original data and preserve privacy by using space partitioning techniques and noisy perturbation of point counts.

An exemplary process 300 for implementing a mechanism for generating synthetic datasets that accurately represent original data and preserve privacy by using space partitioning techniques and noisy perturbation of point counts by utilizing the network environment of FIG. 2 is illustrated as being executed in FIG. 3. Specifically, a first client device 208(1) and a second client device 208(2) are illustrated as being in communication with DPSDG device 202. In this regard, the first client device 208(1) and the second client device 208(2) may be "clients" of the DPSDG device 202 and are described herein as such. Nevertheless, it is to be known and understood that the first client device 208(1) and/or the second client device 208(2) need not necessarily be "clients" of the DPSDG device 202, or any entity described in association therewith herein. Any additional or alternative relationship may exist between either or both of the first client device 208(1) and the second client device 208(2) and the DPSDG device 202, or no relationship may exist.

Further, DPSDG device 202 is illustrated as being able to access an original data for synthetic data generation data repository 206(1) and a synthetic data generation quality utility metrics database 206(2). The differentially private synthetic data generation module 302 may be configured to access these databases for implementing a method for generating synthetic datasets that accurately represent original data and preserve privacy by using space partitioning techniques and noisy perturbation of point counts.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DPSDG device 202 via broadband or cellular communication. Of course, these embodiments are merely exemplary and are not limiting or exhaustive.

Upon being started, the differentially private synthetic data generation module 302 executes a process for generating synthetic datasets that accurately represent original data and preserve privacy by using space partitioning techniques and noisy perturbation of point counts. An exemplary process for generating synthetic datasets that accurately represent original data and preserve privacy by using space partitioning techniques and noisy perturbation of point counts is generally indicated at flowchart 400 in FIG. 4.

Figure 4:
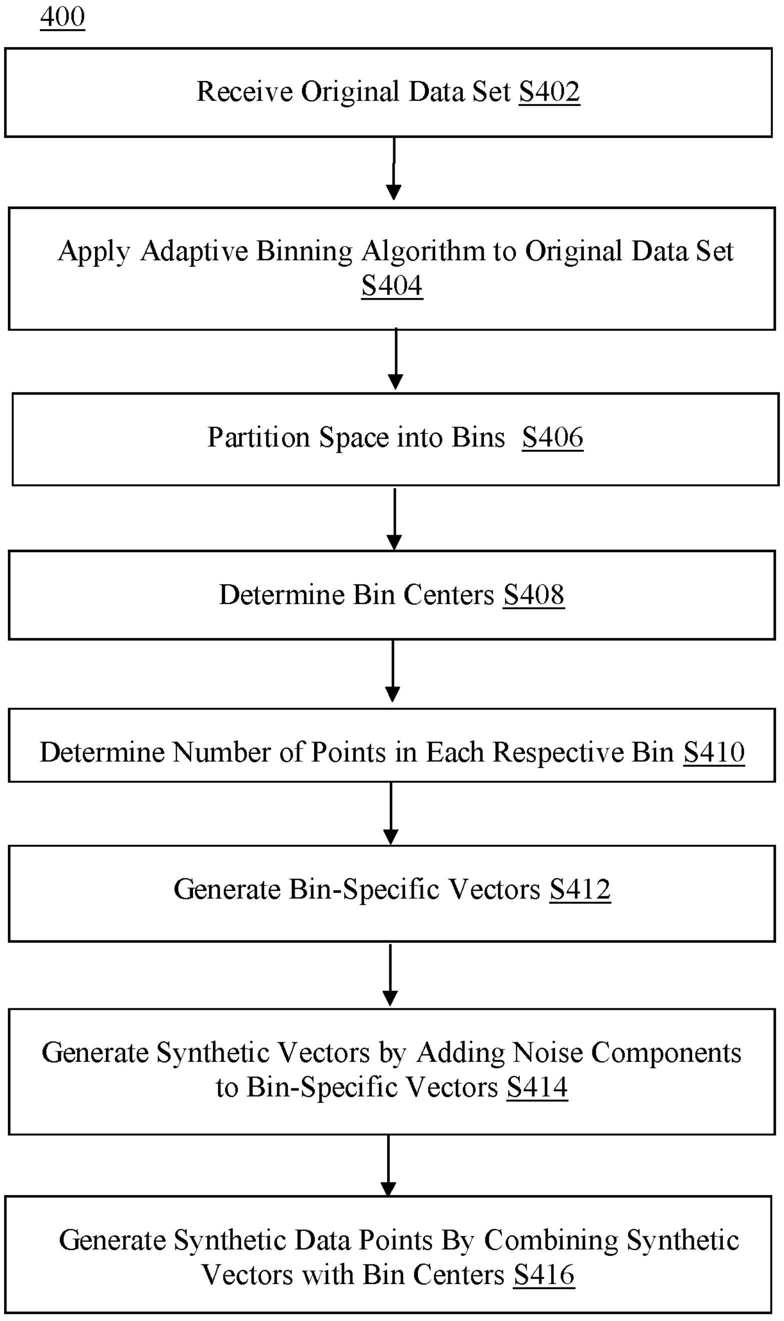
FIG. 4 is a flowchart of an exemplary process for implementing a method for generating synthetic datasets that accurately represent original data and preserve privacy by using space partitioning techniques and noisy perturbation of point counts.

In process 400 of FIG. 4, at step S402, the differentially private synthetic data generation module 302 receives a set of original data that exists in a particular space or domain. Then, at step S404, when a data-dependent approach is being employed, the differentially private synthetic data generation module 302 may apply an adaptive binning algorithm to the set of original data in order to generate a plurality of children nodes within the particular space that respectively correspond to subsets of the original data, thereby ensuring that the original data is partitionable in a manner that facilitates subsequent steps of the process 400. The adaptive binning algorithm is further described in detail below.

At step S406, the differentially private synthetic data generation module 302 partitions the space into a plurality of bins. In an exemplary embodiment, when the data-dependent approach is being employed and the adaptive binning algorithm has been applied to the original data in step S404, the partitioning may be performed by applying a recursive binning algorithm to the output of the adaptive binning algorithm, such that the output of the recursive binning algorithm includes the plurality of bins. The recursive binning algorithm is further described in detail below. Then, at step S408, the differentially private synthetic data generation module 302 determines the center of each respective bin.

At step S410, the differentially private synthetic data generation module 302 determines a number of points, i.e., data items that are included in the set of original data, that are present in each respective bin. Then, at step S412, the differentially private synthetic data generation module 302 generates a set of bin-specific vectors that correspond to the determined numbers of points for each bin.

At step S414, the differentially private synthetic data generation module 302 generates a respective synthetic vector for each bin. In an exemplary embodiment, the generation of the respective synthetic vector is performed by adding a respective noise component to each respective bin-specific vector. In an exemplary embodiment, each respective noise component includes a Laplace noise component having a value that varies inversely with respect to a first predetermined privacy budget value.

Lastly, at step S416, the differentially private synthetic data generation module 302 generates synthetic data points by combining the synthetic vectors generated in step S414 with the bin centers as determined in step S408. In an exemplary embodiment, the addition of the noise components as performed in step S414 enables the objective of preserving privacy within the synthetic data points generated in step S416 to be achieved.

In an exemplary embodiment, when a data-independent approach is employed, step S404 may be omitted from process 400, and the partitioning of the space into bins is performed irrespective of the data included in the set of original data. By contrast, when the data-dependent approach is employed, step S404 is performed, and the partitioning is performed by applying the recursive binning algorithm. In an exemplary embodiment, when the recursive binning algorithm is applied, a second predetermined privacy budget value may be used as an input to the recursive binning algorithm, in order to ensure that differential privacy is maintained with respect to the plurality of bins.

In an exemplary embodiment, systems and methods for generation of a synthetic dataset that simultaneously represents the original data and preserves privacy are provided. The objective of answering statistical queries in a differentially-private manner is addressed by providing data-independent and data-dependent algorithms based on space partitioning for differentially private dataset release. These algorithms are intuitive and transparent, resulting in theoretical results on the utility-privacy tradeoffs where utility is measured with respect to kernel density preservation. The data-dependent approach overcomes the curse of dimensionality and leads to a scalable algorithm.

Inspired by locality sensitive hash functions and near neighbor search algorithms, in an exemplary embodiment, an approach to utility-privacy trade-offs for differentially private (DP) synthetic data generation is based on space partitioning schemes. One objective is to output a dataset that imposes similar kernel density (KD) on the space as the original dataset. Thus, if the space is partitioned into small sections, or bins, and the ratio of points in each of them is preserved, then the kernel density will approximately be preserved.

In an exemplary embodiment, the utility-privacy trade-off is analytically proven for a data independent algorithm for a general setting where no assumptions are made on the distribution of the initial dataset. More precisely, for $\epsilon>0$ and $\delta>0$, if the total number of bins is below a certain threshold, then the output of the algorithm is an $\epsilon$-DP dataset. Moreover, a probabilistic upper bound on the KD distance between the original dataset and output dataset is provided, which holds with probability $1-\delta$. In addition, an improved utility-privacy trade-off for the data independent algorithm under the assumption of Gaussian input dataset in $R^d$ is also presented. This result easily translates to the case of mixture of Gaussians.

In an exemplary embodiment, in comparison to the data independent algorithm, the data dependent algorithm achieves a smaller number of empty bins and more refined partitioning in densely populated areas, which yields a smaller KD distance, i.e., better utility. This enables an overcoming of the curse of dimensionality using an implicit implementation over a large number of instances.

In an exemplary embodiment, there is no use of any black box method, and thus interpretability is achieved, which is a desirable characteristic in certain practical settings and industries. Moreover, there is no requirement that a fraction of original dataset must be public.

Kernel Density Estimates and Reproducing Kernel Hilbert Space (RKHS) distance: For an unweighted dataset $P \subset R^d$ and a kernel $K: R^d \times R^d \rightarrow R$, the kernel density (KD) with respect to P is defined at any point $x \in R^d$ as $$KD_P^K(x) = \frac{1}{|P|}\sum_{p\in P} K(x, p).$$

If P is equipped with weights such that $$\sum_{p\in P} w_p = 1,$$

then kernel density is given by $$KD_P^K(x) = \sum_{p\in P} w_p K(x, p).$$

For ease of notation, this quantity may be expressed as $KD_P(\cdot)$ instead of $KD^K_P(\cdot)$. For the two datasets P and Q, the $\ell\infty$ distance of two KDs is defined as $$|KD_P - KD_Q|_\infty = sup^d_{x\in R}|KD_P(x) - KD_Q(x)|.$$

If K is positive definite, then K(p, x) can be represented as an inner product in RKHS $H_K$. In this aspect, there is $\phi_K: R^d \rightarrow H_K$ such that $\phi_K(x)=K(x, \cdot)$. For a positive definite kernel K, if $\phi_K$ is injective, then maximum mean discrepancy (MMD) is given by $$MMD(P, Q) = \sqrt{\kappa(P, P) + \kappa(Q, Q) - 2\kappa(P, Q)} \quad (1)$$

where $$\kappa(P, Q) = \frac{1}{|P|}\frac{1}{|Q|}\sum_{p\in P}\sum_{q\in Q} K(p, q)$$

represents a kernel metric between two datasets. It is possible to convert between bounds on $\ell\infty$-distance of KDs and MMD. More precisely, $MMD(P,Q)\leq\epsilon$ implies $\|KD_P-KD_Q\lambda_\infty \leq\epsilon$, and also $\|KD_P-KD_Q\|\leq\epsilon$ implies $$MMD(P, Q) \leq \sqrt{2\epsilon}$$

In an exemplary embodiment, a theoretical analysis on utility guarantees is presented in terms of bounds on KD distance, while for experiments, MMD may be used as the measure of utility due to the ease of computation.

Differential privacy (DP) has become a de facto standard to quantify privacy leakage from publishing functions of a dataset. In this aspect, DP provides theoretical guarantees that a potential adversary is not able to distinguish whether a particular individual was present in a dataset.

Definition 1: A randomized mechanism $M: X^n \rightarrow Y$ is $\epsilon$-differentially private if for any two datasets $D, D' \in X_n$ that differ in only one entry, the following expression is satisfied:

$$\forall C \subseteq y,\ \mathbb{P}(M(D) \in C) \leq e \in \mathbb{P}(M(D') \in C). \quad (2)$$

A standard way to achieve $\epsilon$-DP is to employ a Laplace mechanism, i.e., add Laplace noise to the output of the algorithm. More precisely, for a function f computed on sensitive data D, the following expression is provided:

$$M_{Lap}(D, f(\cdot), \epsilon) = f(D) + \mathrm{Lap}(0, \Delta_f/\epsilon), \text{ where}$$

$$\Delta_f = \max_{D,D'} \|f(D') - f(D')\|_1$$

is the $\ell_1$ sensitivity of f with respect to change of a single query in the dataset ($D, D' \in X^n$ are two neighboring datasets, i.e., that they differ in only one entry) and Lap denotes a Laplace random variable parametrized by the mean and scale.

The post-processing property of $\epsilon$-DP guarantees that composition of any data independent function with the output of $\epsilon$-DP mechanism is also $\epsilon$-DP, i.e., it does not incur additional privacy leaks. In particular, this means that differentially private synthetic data can be safely used for downstream tasks. Composition of $\epsilon$-DP guarantees that a combination of $\epsilon 1$-DP algorithm $M_1$ and $\epsilon 2$-DP algorithm $M_2$ defined by $M_{1,2}=(M_1, M_2)$ is $(\epsilon 1+\epsilon 2)$–DP.

Problem formulation: A multidimensional numerical dataset $P=\{p_1, p_2, \ldots, p_n\}$ of n records in $R^d$ is provided. In an exemplary embodiment, the task is to design a differentially private algorithm that outputs a possibly weighted dataset $Q=\{(q_1,w_1), \ldots, (q_m, w_m)\}$ where $q_i \in R^d$, $w_i \in R^+$, such that for any $x \in R^d$, $$KD_P^K(x) \approx KD_Q^K(x),$$

where K is some positive definite kernel. The closeness of $KD_P$ and $KD_Q$ in $\ell\infty$-distance implies that relying on Q instead of P leads to a consistent estimation of population statistics of original dataset P, i.e., synthetic dataset Q faithfully represents the original P. In other words, both $\ell\infty$-distance of KDs and MMD represent good utility measures when evaluating quality of synthetic datasets. For simplicity of presentation, there is a focus on the Gaussian kernel as expressed below:

$$K(x, p) = e^{-\frac{\|z-p\|_2^2}{2\sigma^2}},$$

However, it is straightforward to adapt the analysis to a wider class of kernels.

Data independent algorithm: In an exemplary embodiment, a data independent algorithm for synthetic dataset release with DP guarantees is presented. Inspired by the widely used idea of space partitioning, one objective is to partition the space into a number of bins, e.g., J cubes of width w. Then the number of points inside each bin is counted, and these counts are presented on a J-dimensional vector. Any single data point can affect this vector at most by a constant in terms of $\ell 1$ distance. In other words, it has a bounded $\ell 1$ sensitivity with respect to any two neighbouring datasets. Thus, the Laplace mechanism may be employed in order to achieve $\epsilon$-DP. Bins with the noisy count below input threshold t will be removed, i.e., filtered out. The algorithm outputs the dataset consisting of centers of the bins that survived the filtering step and the corresponding noisy point counts. See Algorithm 1.

FIG. 5 is an algorithm 500 (i.e., Algorithm 1) to be applied for performing a data-independent binning function in a method for generating synthetic datasets that accurately represent original data and preserve privacy by using space partitioning techniques and noisy perturbation of point counts, according to an exemplary embodiment.

Theorem 2 (Differential privacy of Algorithm 1): The output of Algorithm 1 is $\epsilon$-DP. Proof. First, note that the centers of the bins are chosen independently of the dataset.1 For J-dimensional point counts (see line 7 of Algorithm 1) v and v^ corresponding to two datasets P and ^P that differ in exactly one element, it is true that $\|v-\hat{v}\|_1 \le 2$. Hence, the $\ell 1$-sensitivity is upper bounded by 2, and one can achieve $\epsilon$-DP by adding Lap($2/\epsilon$) noise to each entry of the J dimensional embedding, as per line 9 of Algorithm 1. The post processing property of DP guarantees that removing bins with noisy counts less than threshold t does not yield additional privacy leaks, as per line 10 of Algorithm 1.

Worst-case utility-privacy trade-off (t=0 case): The worst case utility of Algorithm 1 is now analyzed, i.e., the general case when there are no assumptions imposed on the distribution of the input dataset P. Theorem 3 (Worst-case tradeoff of Algorithm 1): Suppose that dataset P lies on an axes-aligned hypercube of edge length R in $R^d$. Let $\delta>0$ be such that $$\left(\frac{R}{w}\right)^d < \frac{\in n}{4\log\frac{1}{\delta}}.$$

Then Algorithm 1 outputs an $\epsilon$-DP dataset Q such that $$\sup_{x\in\mathbb{R}^d} |KD_Q(x) - KD_P(x)| \le \frac{2}{\frac{\in n}{4\log\frac{1}{\delta}} - 1} + \frac{\omega}{2}\sqrt{\frac{d}{e}},$$

with probability at least $1-\delta$, where $$J = \left(\frac{R}{\omega}\right)^d.$$

Proof sketch: Firstly, Theorem 2 guarantees that the output of Algorithm 1 is $\epsilon$-DP. Let P':=\{(c1, v1), . . . , (cJ, vJ)\}, where v, c are defined as in line 7 and 8 of Algorithm 1, respectively. Triangle inequality over the errors coming from the following sources completes the proof.

Rounding to the bin centers. It is provable that $$\sup_{x\in\mathbb{R}^d} |KD_{P'}(x) - KD_P(x)| \le \frac{\omega\sqrt{d}}{2\sqrt{e}}.$$

Adding Laplace noise and removing negatively weighted bins. It is provable that $$\sup_{x|\in\mathbb{R}^d} |KD_Q(x) - KD_{P'}(x)| \le \frac{8J\log\frac{1}{\delta}}{\in n - 4J\log\frac{1}{\delta}}.$$

This comes as a consequence of upper bound on J from the statement of the theorem.

For t=0, Algorithm 1 suffers some apparent shortcomings. If data is well spread in the space, there will be many bins with relatively small number of points. After Laplace noise addition, point counts in such bins would frequently be negative, which would lead to the bins being removed from the algorithm's output. Conversely, empty bins would with probability 0.5 exhibit positive point counts after the noise addition step, and would thus falsely be represented in the algorithm's output. Both aspects hurt utility. A natural way to overcome these shortcomings is to increase the cut-off threshold. Imposing a threshold is particularly well suited if it is known that most non-empty bins are densely populated.

Beyond worst-case utility-privacy trade-off (t>0 case): Definition 4. For a threshold t>0, bins with noiseless count less than t will be called t-light, and bins with noiseless counter greater than or equal to t will be called t-heavy.

Theorem 5 (Beyond worst-case trade-off of Algorithm 1): Suppose that input dataset P lies on an axes-aligned hypercube of edge length R in $R^d$. Assume that $\delta>0$ is such that $$\left(\frac{R}{\omega}\right)^d \le \frac{1}{\delta}.$$

For $$t = \frac{8}{\in}\log(1/\delta),$$

let M and m be the total number of t/2-heavy bins and the total number of points in 3t/2-light bins, respectively. Then, Algorithm 1 outputs $\epsilon$-DP dataset Q such that $$\sup_{x\in\mathbb{R}^d} |KD_Q(x) - KD_P(x)| \le \frac{\in m + 8M\log\frac{1}{\delta}}{\in n - \in m - 4M\log\frac{1}{\delta}} + \frac{m}{n} + \frac{\omega\sqrt{d}}{2\sqrt{e}},$$

with probability at least $1-\delta$.

Proof sketch. By Theorem 2, it is guaranteed that the output of Algorithm 1 is $\epsilon$-DP. Let $P':=\{(c_1, v_1), \ldots, (c_J, v_J)\}$, where v, c are defined as in lines 7 and 8 of Algorithm 1. The proof relies on the union bound argument and the triangle inequality over the following sources of error.

Rounding to the bin centers error. It is provable that for any $x \in R^d$, the following expression is true:

$$|KD_P(x) - KD_{P'}(x)| \le \frac{\omega\sqrt{d}}{2\sqrt{e}}.$$

With probability at least $1-\delta/2$, all bins that are removed in the filtering step are 3t/2-light. That is, there are at most m points in bins that are filtered out. Thus the error caused by removing non-empty bins in the filtering step contributes to $\sup_{x\in R^d} |KD_{P'}(x)-KD_Q(x)|$ by at most m/n.

With probability at least $1-\delta/2$, all bins that survive filtering are t/2-heavy. Prior to the noise addition, the total number of points in this set of bins is lower bounded by n−m and upper bounded by n. Having in mind that there are at most M of such bins, after Laplace noise addition the total noisy count in this set of bins is lower bounded by $$n - m - \frac{4M}{\in}\log\left(\frac{1}{\delta}\right)$$

and upper bounded by $$n + \frac{4M}{\in}\log\left(\frac{1}{\delta}\right).$$

This yields an additional $$\frac{em + 8M\ \log(1/\delta)}{en - em - 4M\ \log(1/\delta)}$$

term for the upper bound on $$sup^d_{x\in R}|KD_{P'}(x) - KD_Q(x)|.$$

It is noted that filtering threshold t in Theorem 5 depends on privacy level $\epsilon$, and thus both M and m depend on $\epsilon$. In general, with no assumptions on the distribution of P, it is not possible to provide meaningful bounds on M and m.

Special case: Original dataset from mixture of Gaussians: The following is an analysis of the performance of Algorithm 1 for the special case of the original dataset coming from a multivariate Gaussian distribution. This enables a generalization of the analysis to a mixture of multivariate Gaussians. More precisely, a dataset P of n records in $R^d$ with Gaussian distribution $N(c, \sigma^2 I)$, $c \in R^d$ is considered, i.e., from density $$f(X = x) = \frac{1}{(2\pi\sigma^2)^{d/2}} e - \frac{\|z - c\|_2^2}{2\sigma^2}.$$

Theorem 6 (Gaussian trade-off using Algorithm 1): Suppose that input dataset P lies on an axes-aligned hypercube of edge length R in $R^d$. If $$n \ge \left(\frac{\omega}{\sigma\sqrt{2\pi}}\right)^d \text{ for } \delta > 0$$

such that $$\frac{n}{(\log\ n)^{d/2}} \ge 16 \cdot \log\frac{1}{\delta} \cdot \left(\frac{12\sigma}{\omega}\right)^2$$

and threshold $$t = \frac{8}{\in}\log(1/\delta),$$

Algorithm 1 outputs $\epsilon$-DP dataset Q such that $$\frac{sup}{x \in \mathbb{R}^4}|KD_Q(x) - KD_P(x)| \le \frac{3}{n^{1/12}} + \frac{\omega\sqrt{d}}{2\sqrt{e}} + \frac{16\log\frac{1}{\delta}\cdot\left(\frac{12\sigma}{\omega}\right)^d(\log n)^{d/2}}{\in n},$$

with probability at least $1-\delta$.

Proof sketch. This is a special case of Theorem 5. The Gaussian distribution assumption enables a provision of upper bounds on the number of t/2-heavy bins m, and on the total number of points in 3t/2-light bins M, for $$t = \frac{8}{\in}\log(1/\delta).$$

Loosely speaking, in this case, the majority of points live within densely populated areas, and so it is true that there are not too many points in the light bins, and it is also true that the number of heavy bins is not too large.

As the crux of the proof is to provide upper bounds on m and M, with the use of the union bound argument, it is straightforward to translate Theorem 6 to the analogous result for P from a mixture of Gaussians.

Data dependent algorithm: In the general case, data independent approaches are doomed to suffer from the curse of dimensionality. The reason is that as opposed to traditional applications of hash functions, it is important to keep track of empty bins in order to treat them similarly to non-empty bins, as a bin that is empty with respect to P is not necessarily empty with respect to a neighbouring dataset. Particularly, in high dimensions, this makes the data independent binning impractical, as there would typically be too many empty bins. Moreover, in densely populated parts of the space, more refined grid would incur smaller error due to the rounding to the centers, and thus yield a higher utility. Both aspects motivate data dependent binning approaches.

In an exemplary embodiment, a differentially private algorithm is based on adaptive binning i.e., recursive partitioning of the space. Before proceeding, the notion of a decision tree is introduced. It is assumed that there is an arbitrary but fixed enumeration of d dimensions denoted by i, where $i \in [d]$. The root of the tree is characterized by the initial dataset P, the center c and the the edge R of the smallest axis aligned cube that contains whole P, and axes 0 to split along. If decision at the root is to proceed with recursion, the following procedure is used. Initial recursion splits the dataset along axes 0 and divides the corresponding edge of the cube in two equal R/2 parts, which results in the creation of two children nodes. Each of them is characterized by a fraction of the dataset that ended up in the corresponding part, center and the radius of the new cube that contains that fraction of the dataset, and new axes to cut along. The new axes to cut along is always previous axes +1, i.e., the next axes in ordering [d]. The recursion proceeds on the newly created nodes, subject to a positive decision on whether to recurse further. Nodes on which recursion does not proceed do not have any children and represent leaves.

Note that due to the data dependent aspect, it is important to ensure that adaptive binning is differentially private. Thus, each decision on whether to recurse or not must be based on noisy point counts. By the composition property of DP, if there are $\ell$ levels of data dependent decisions in the decision tree, one needs to guarantee $\epsilon'/\ell$-DP for each recursion, so that once the binning algorithm terminates, $\epsilon'$-DP is achieved. Note that the output of adaptive binning is partitioning of the space, not the synthetic data set, and thus once the binning is done, the setting is the beginning of Algorithm 1. That is, in order to release a differentially private synthetic dataset, one must obtain noisy versions of the point counts bin by bin and output bins that pass a certain threshold. By ensuring a $\epsilon''$-DP for this part of the procedure, one will achieve a $(\epsilon'+\epsilon'')$-DP guarantee for the whole algorithm by the composition property of DP.

Avoiding large bins: In high dimensions, it is frequently observed that there are large bins where recursion stops due to small noisy point counts. This would however yield a relatively large error due to rounding to the center, since the bin has large edge lengths. Thus it would be beneficial to have the algorithm run bin splitting independently of data for a few rounds, e.g., until it reaches a maximum edge length for all bins below some threshold $s_1$. After that, the algorithm would run in a data dependent regime. Note that the depth of data independent part in this setting is $h=d \log_2 (R/s_1)$, and up until that level there are no privacy leaks.

Avoiding decision trees with large depth: The privacy cost of adaptive binning is determined by the number of data dependent levels in decision tree. Thus, even if noisy point counts are large, it might be beneficial to stop the recursion once the number of data dependent levels passes a certain threshold. Equivalently, the recursion is stopped over a bin when its maximal edge length is below a certain threshold $s_2$, regardless of the value of the noisy point count. In this setting, the maximum tree depth is $h'=d \log_2 (R/s_2)$, and having in mind above discussion, the number of data dependent levels is at most $h'-h=\log_2 (s_1/s_2)$.

FIG. 6 is an algorithm 600 (i.e., Algorithm 2) to be applied for performing a data-dependent adaptive binning function in a method for generating synthetic datasets that accurately represent original data and preserve privacy by using space partitioning techniques and noisy perturbation of point counts, according to an exemplary embodiment. FIG. 7 is an algorithm 700 (i.e., Algorithm 3) to be applied for performing a data-dependent recursive binning function in a method for generating synthetic datasets that accurately represent original data and preserve privacy by using space partitioning techniques and noisy perturbation of point counts, according to an exemplary embodiment.

Algorithm 2 formally describes an adaptive binning methodology. More precisely, Algorithm 2 identifies the root of the tree as discussed above, and passes it to Algorithm 3. Lines 3 and 4 of Algorithm 2 identify the boundaries of the dataset along each of d dimensions, line 5 identifies the center of the cube, and line 6 identifies the edge of the cube that contains the whole dataset. Axes for next split is set to 0, and the root node is passed to Algorithm 3.

Algorithm 3 implements differentially private recursive binning. Algorithm3 takes as an input a node, a total privacy budget (i.e., until the recursion stops), a threshold for the noisy point counts, and the maximum and minimum allowed edge lengths of final bins. The output of the algorithm is the set of bins. According to the previous discussion, the algorithm will recurse if either noisy point count is larger than the threshold, or the bin's largest edge is too large (line 5), with the exception of that if the largest edge is too small (line 7), recursion stops regardless of the value of the noisy point count. If recursion proceeds, the current node is split in two and recursion proceeds on each of them.

Theorem 7. For any dataset P, $\epsilon'>0$, $\tau>0$, $s_1$, $s_2>0$, Algorithm 2 returns a tree such that the set of bins determined by its leaves is $\epsilon'$-differentially private.

Proof. Data dependent part of the decision tree for this algorithm has maximum depth $h'-h=d \log_2 (s_1/s_2)$. Each neighboring dataset affects only one root to leaf path, and thus it is enough to consider maximal privacy loss incurred along a single path to the leaf. Also, since the $\ell 1$ sensitivity of the point counts is 1, it suffices to add $LAP(2(h'-h)/\epsilon')$ noise to each decision condition in order to guarantee $\epsilon'$-differential privacy for the entire path. Note that two neighboring datasets differ in the point counts in at most two paths.

Theorem 8. For a dataset P and $\epsilon'>0$, let $c_1, \ldots, c_J \in R^d$ denote centers of bins corresponding to the leaves of tree output by Algorithm 2, and $v \in R^J$ be the vector of corresponding point counts in each bin. If $c_1, \ldots, c_k$ and v are passed to line 9 of Algorithm 1 with $\epsilon''>0$, then the final output of Algorithm 1 is $\epsilon'+\epsilon''$-DP dataset Q.

Proof. Consequence of composition property of DP.

Implicit sampling of empty bins: As discussed above, the number of empty bins grows exponentially in dimension, and this represents a challenge, as empty bins must be treated in a same manner as non-empty bins for the purpose of achieving DP. Thus, efficient implementation of these algorithms would avoid storing all bins and iterating through them for the purpose of noise addition and filtering. In an exemplary embodiment, this is addressed by implicitly implementing the noise addition and filtering on empty bins. This benefits both data independent Algorithm 1 and data dependent Algorithm 2.

FIG. 8 is an algorithm 800 (i.e., Algorithm 4) to be applied for performing an explicit implementation function in a method for generating synthetic datasets that accurately represent original data and preserve privacy by using space partitioning techniques and noisy perturbation of point counts, according to an exemplary embodiment.

FIG. 9 is an algorithm 900 (i.e., Algorithm 5) to be applied for performing an implicit implementation function in a method for generating synthetic datasets that accurately represent original data and preserve privacy by using space partitioning techniques and noisy perturbation of point counts, according to an exemplary embodiment.

Lemma 9. Explicit implementation of noise addition and filtering on empty bins as per Algorithm 4 is equivalent to the implicit implementation provided in Algorithm 5. In Algorithm 5, CONDITIONAL LAP(2/∈, t) denotes a random variable with Laplace distribution conditioned on being greater than or equal to t.

Implicit sampling for data independent Algorithm 1: For the data independent algorithm, implicit implementation of empty bins sampling is straightforward. Instead of storing $$\left(\frac{R}{\omega}\right)^d$$

bins centers, it is enough to store only those corresponding to non-empty bins, and sample empty centers via independent uniform random sampling of each coordinate from the set of possible values, and rejection if gluing them together gives a center corresponding to a non-empty bin). Note that this requires $$O\left(\frac{R}{\omega}\cdot d\right)$$

values for non-empty bins instead of $$O\left(\frac{R}{\omega}\right)^d.$$

Implicit sampling in the data dependent Algorithm 2: In the context of data independent Algorithm 1, it is straightforward to see that storing non-empty bins enables sampling of a desired number of empty bins for an implicit noise addition/filtering step as per Algorithm 5. For data dependent Algorithm 2, the task is more challenging. Note that the union of the set of empty and non-empty bins provided as an output of Algorithm 2 coincides with the set of leaves in the tree of recursion decisions. The question is, from the information on the number of data independent levels h, and paths from the root to the leaves corresponding to non-empty bins, whether one can recover the remaining set of leaves, i.e., those corresponding to the empty bins. In this aspect, it is provable that this is possible for a large enough cut off threshold τ (see line 5 in Algorithm 3), which guarantees that with high probability the algorithm does not partition empty bins further in the data dependent part of the algorithm.

Lemma 10. Let h' and h denote total depth and the depth of the data independent part of the tree, respectively. If the threshold τ in line 5 of Algorithm 3 is set to be greater than $$\frac{2(h'-h)}{\epsilon'}\log\left(\frac{1}{\delta}\cdot\left(2^h+n(h'-h)\right)\right),$$

then with probability 1−δ the adaptive binning will not divide any empty bin.

Theorem 11. If threshold t in line 5 of Algorithm 3 is selected as per Lemma 10, then storing information on the number of data independent levels h and paths to leaf nodes that represent non-empty bins, enables implicit sampling of empty bins as per Algorithm 5.

Proof. Lemma 10 guarantees that no empty bin is further recursed on. Thus, each parent node has at most one child corresponding to an empty bin. In particular, for each two non-empty bins, it is possible to identify their common ancestor and the number of empty bins between them. Thus, the set of empty bins can be recovered from the encoding of non-empty bins.

Accordingly, with this technology, an optimized process for generating synthetic datasets that accurately represent original data and preserve privacy by using space partitioning techniques and noisy perturbation of point counts is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for generating a synthetic data set, the method being implemented by at least one processor, the method comprising:

receiving, by the at least one processor, a first set of original data that exists in a first space, the first set of original data including sensitive information;

confirming the first set of original data is partitionable by applying an adaptive binning algorithm;

partitioning, by the at least one processor in response to the confirming, the first space into a plurality of bins, each respective bin from among the plurality of bins having a predetermined first width, the partitioning comprising applying a recursive binning algorithm to an output of the adaptive binning algorithm, wherein the plurality of bins is determined as an output of the recursive binning algorithm;

determining, by the at least one processor for each respective bin from among the plurality of bins, a respective center of the respective bin;

determining, by the at least one processor for each respective bin from among the plurality of bins, a respective number of points from among the first set of original data that is inside the respective bin;

generating, by the at least one processor for each determined respective number of points, a respective bin-specific vector that corresponds to the respective bin;

generating, by the at least one processor for each respective bin-specific vector, a respective synthetic vector that corresponds to the respective bin by adding a respective noise component to the respective bin-specific vector; and generating, by the at least one processor, a respective synthetic data point to be included in the synthetic data set by combining, for each respective bin, the respective synthetic vector that corresponds to the respective bin with the respective center of the respective bin, wherein the respective synthetic data point obfuscates the sensitive information of the first set of original data;

wherein for a first predetermined privacy budget value ε1, the first set of original data is ε1—differentially private with respect to the synthetic data set;

wherein the respective noise component comprises a Laplace noise component having a value that varies inversely with respect to the first predetermined privacy budget value ε1;

wherein the recursive binning algorithm uses the first predetermined privacy budget value ε1 and a second predetermined privacy budget value ε2 as inputs in order to ensure differential privacy is maintained with respect to the plurality of bins;

wherein when a first subset of the first set of original data that corresponds to the first predetermined privacy budget value ε1 is combined with a second subset of the first set of original data that corresponds to the second predetermined privacy budget value ε2, a combination of the first subset and the second subset is (ε1+ε2)—differentially private with respect to the synthetic data set;

wherein the first subset comprises the first subset of the first set of original data and the first predetermined privacy budget value ε1; and wherein the second subset comprises the second subset of the first set of original data and the second predetermined privacy budget value ε2.

2. The method of claim 1, further comprising:

identifying at least one respective synthetic vector for which the respective noise component has a value that is less than a predetermined noise threshold; and filtering out the at least one respective synthetic vector before performing the generating of the respective synthetic data point that corresponds to the at least one respective synthetic vector.

3. The method of claim 1, further comprising:

the adaptive binning algorithm applied to the first set of original data generates a plurality of children nodes that respectively correspond to subsets of the first set of original data.

4. The method of claim 1, further comprising stopping an application of the recursive binning algorithm when a number of data-dependent levels of a decision tree that corresponds to an output of the recursive binning algorithm exceeds a predetermined threshold.

5. A computing apparatus for generating a synthetic data set, the computing apparatus comprising:

a processor;

a memory; and a communication interface coupled to each of the processor and the memory, wherein the processor is configured to:

receive, via the communication interface, a first set of original data that exists in a first space, the first set of original data including sensitive information;

confirm the first set of original data is partitionable by applying an adaptive binning algorithm;

partition, in response to the confirm, the first space into a plurality of bins, each respective bin from among the plurality of bins having a predetermined first width, the partition comprising applying a recursive binning algorithm to an output of the adaptive binning algorithm, wherein the plurality of bins is determined as an output of the recursive binning algorithm;

determine, for each respective bin from among the plurality of bins, a respective center of the respective bin;

determine, for each respective bin from among the plurality of bins, a respective number of points from among the first set of original data that is inside the respective bin;

generate, for each determined respective number of points, a respective bin-specific vector that corresponds to the respective bin;

generate, for each respective bin-specific vector, a respective synthetic vector that corresponds to the respective bin by adding a respective noise component to the respective bin-specific vector; and generate a respective synthetic data point to be included in the synthetic data set by combining, for each respective bin, the respective synthetic vector that corresponds to the respective bin with the respective center of the respective bin;

wherein the respective synthetic data point obfuscates the sensitive information of the first set of original data;

wherein for a first predetermined privacy budget value ε1, the first set of original data is ε1—differentially private with respect to the synthetic data set;

wherein the respective noise component comprises a Laplace noise component having a value that varies inversely with respect to the first predetermined privacy budget value ε1;

wherein the recursive binning algorithm uses the first predetermined privacy budget value ε1 and a second predetermined privacy budget value ε2 as inputs in order to ensure differential privacy is maintained with respect to the plurality of bins;

wherein when a first subset of the first set of original data that corresponds to the first predetermined privacy budget value ε1 is combined with a second subset of the first set of original data that corresponds to the second predetermined privacy budget value ε2, a combination of the first subset and the second subset is (ε1+ε2)—differentially private with respect to the synthetic data set;

wherein the first subset comprises the first subset of the first set of original data and the first predetermined privacy budget value ε1; and wherein the second subset comprises the second subset of the first set of original data and the second predetermined privacy budget value ε2.

6. The computing apparatus of claim 5, wherein the processor is further configured to:

identify at least one respective synthetic vector for which the respective noise component has a value that is less than a predetermined noise threshold; and filter out the at least one respective synthetic vector before performing the generate of the respective synthetic data point that corresponds to the at least one respective synthetic vector.

7. The computing apparatus of claim 5, wherein the processor is further configured to:

the adaptive binning algorithm applied to the first set of original data generates a plurality of children nodes that respectively correspond to subsets of the first set of original data.

8. The computing apparatus of claim 5, wherein the processor is further configured to stop an application of the recursive binning algorithm when a number of data-dependent levels of a decision tree that corresponds to an output of the recursive binning algorithm exceeds a predetermined threshold.

9. A non-transitory computer readable storage medium storing instructions for generating a synthetic data set, the storage medium comprising executable code which, when executed by a processor, causes the processor to:

receive a first set of original data that exists in a first space, the first set of original data including sensitive information;

confirm the first set of original data is partitionable by applying an adaptive binning algorithm;

partition, in response to the confirm, the first space into a plurality of bins, each respective bin from among the plurality of bins having a predetermined first width, the partition comprising applying a recursive binning algorithm to an output of the adaptive binning algorithm, wherein the plurality of bins is determined as an output of the recursive binning algorithm;

determine, for each respective bin from among the plurality of bins, a respective center of the respective bin;

determine, for each respective bin from among the plurality of bins, a respective number of points from among the first set of original data that is inside the respective bin;

generate, for each determined respective number of points, a respective bin-specific vector that corresponds to the respective bin;

generate, for each respective bin-specific vector, a respective synthetic vector that corresponds to the respective bin by adding a respective noise component to the respective bin-specific vector; and generate a respective synthetic data point to be included in the synthetic data set by combining, for each respective bin, the respective synthetic vector that corresponds to the respective bin with the respective center of the respective bin;

wherein the respective synthetic data point obfuscates the sensitive information of the first set of original data;

wherein for a first predetermined privacy budget value ε1, the first set of original data is ε1—differentially private with respect to the synthetic data set;

wherein the respective noise component comprises a Laplace noise component having a value that varies inversely with respect to the first predetermined privacy budget value ε1;

wherein the recursive binning algorithm uses the first predetermined privacy budget value ε1 and a second predetermined privacy budget value ε2 as inputs in order to ensure differential privacy is maintained with respect to the plurality of bins;

wherein when a first subset of the first set of original data that corresponds to the first predetermined privacy budget value ε1 is combined with a second subset of the first set of original data that corresponds to the second predetermined privacy budget value ε2, a combination of the first subset and the second subset is (ε1+ε2)—differentially private with respect to the synthetic data set;

wherein the first subset comprises the first subset of the first set of original data and the first predetermined privacy budget value ε1; and wherein the second subset comprises the second subset of the first set of original data and the second predetermined privacy budget value ε2.

* * * * *